United States Patent [19]
Hoshino et al.

[11] 4,027,284
[45] May 31, 1977

[54] CHARACTER RECOGNIZING SYSTEM FOR MACHINE-PRINTED CHARACTERS

[75] Inventors: Yukio Hoshino; Hideo Tsuiki; Toshio Miyazaki; Tetsuo Miura, all of Tokyo, Japan

[73] Assignee: Nippon Electric Company, Ltd., Tokyo, Japan

[22] Filed: June 5, 1975

[21] Appl. No.: 584,228

[30] Foreign Application Priority Data
June 5, 1974  Japan .............................. 49-64413

[52] U.S. Cl. .................................... 340/146.3 AQ
[51] Int. Cl.² ........................................ G06K 9/00
[58] Field of Search .......... 340/146.3 AQ, 146.3 R, 340/146.3 Y

[56] References Cited
UNITED STATES PATENTS 3,182,290  5/1965  Rabinow .................. 340/146.3 AQ
3,829,831  8/1974  Shinjiyamamoto et al. .... 340/146.3 AQ Primary Examiner—Joseph M. Thesz
Attorney, Agent, or Firm—Sughrue, Rothwell, Mion, Zinn & Macpeak

[57] ABSTRACT

A character recognizing system for recognizing an input pattern of a character by comparing with a plurality of standard patterns is disclosed. The standard patterns are classified into a plurality of groups, and each group has a common standard pattern and a plurality of non-common standard patterns. The non-common standard patterns represent differences between the standard patterns and the common standard pattern. An input pattern read out by scanning a printed character is first compared with the common standard pattern of any group. When the difference between the input pattern and the common standard pattern is less than a predetermined value, the input pattern is compared with the non-common standard patterns in the same group.

4 Claims, 25 Drawing Figures

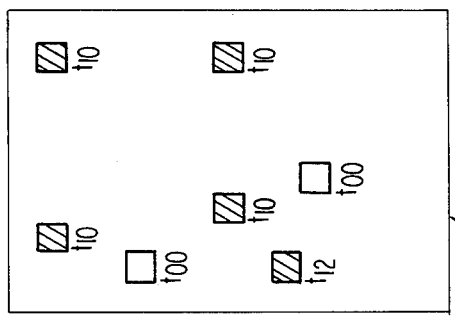
FIG.4A
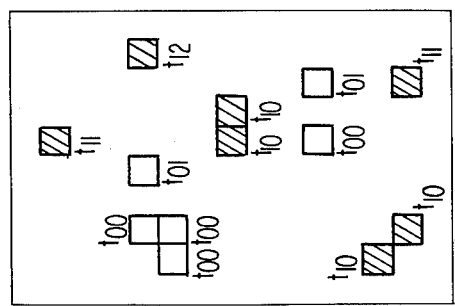
FIG.4B
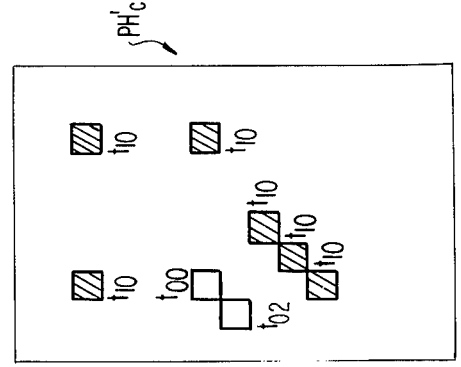
FIG.4C
FIG.3

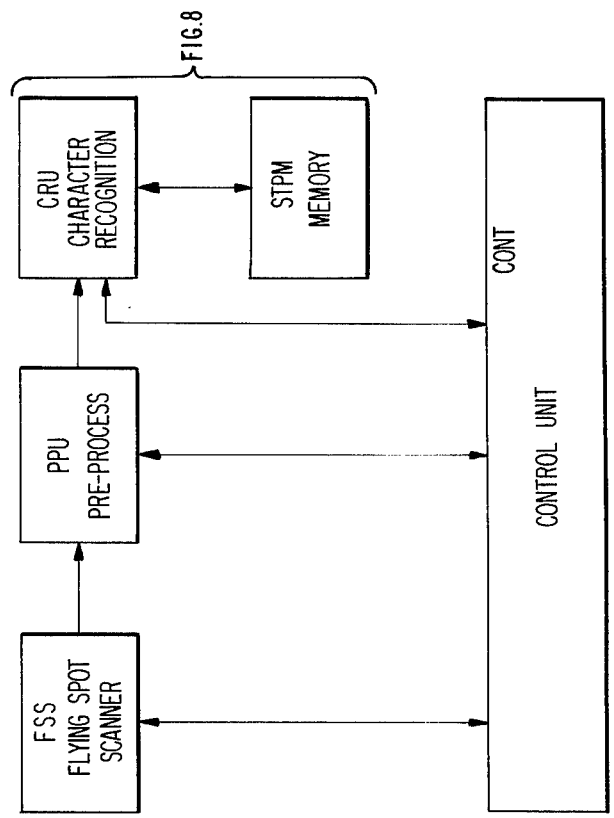
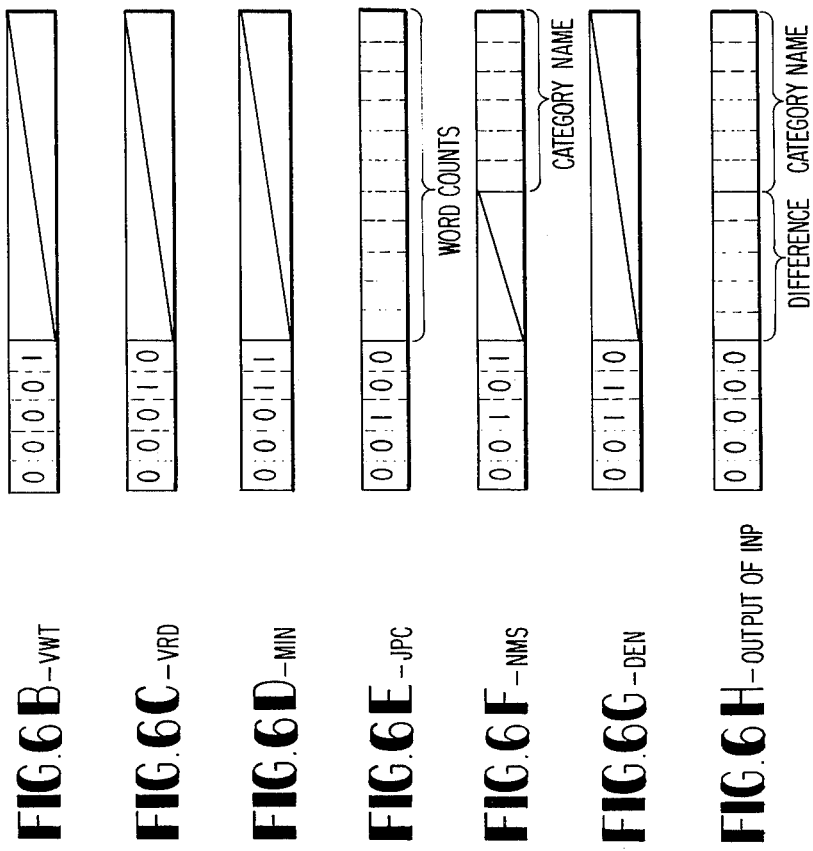
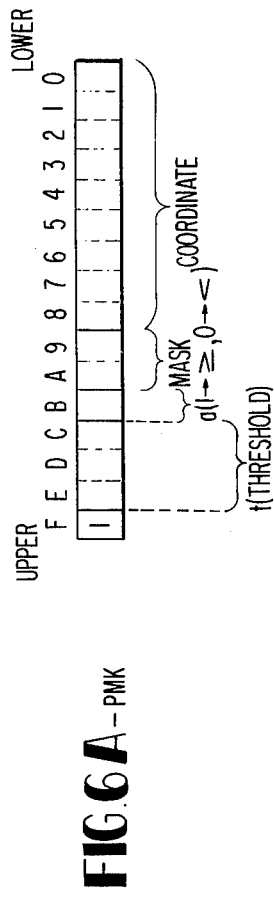

CHARACTER RECOGNIZING SYSTEM FOR MACHINE-PRINTED CHARACTERS

BACKGROUND OF THE INVENTION

This invention relates to a character recognizing system for machine-printed characters such as alphanumerics, in which the characters are recognized through their comparison with a plurality of standard patterns of the characters.

DESCRIPTION OF THE PRIOR ART

In a conventional character recognizing system, the character recognition is achieved by comparision of an input pattern with a plurality of predetermined standard patterns. For this purpose, a great number of standard patterns are provided, for example, at least 10 kinds of standard patterns in numeric, and at least 26 kinds in alphabet. Further, in the case where the characters to be recognized have various kinds of character-types or fonts, a greater number of standard patterns are necessary so as to recognize the input patterns with minimum errors. Therefore, the conventional system requires a memory means of great capacity. This makes the system more expensive as a whole.

SUMMARY OF THE INVENTION

It is therefore, an object of this invention to provide an improved character recognizing system requiring a smaller capacity of the memory means.

According to this invention, there is provided a character recognizing system in which a great number of standard patterns are classified into a plurality of groups each having one common standard pattern in turn having a pattern arrangement in common with the standard patterns of each group, and a plurality of non-common standard patterns representing differences between the standard patterns and the common standard pattern. An input pattern read out by scanning a printed character is first compared with the common standard pattern of any group. Only when the difference from the common standard pattern is less than a predetermined value, the input pattern is compared with the non-common standard patterns in the same group.

BRIEF DESCRIPTION OF THE DRAWINGS

The features and advantages of this invention will be understood from the following detailed description of preferred embodiments of this invention taken in conjunction with the accompanying drawings, wherein:

FIG. 3 shows mask patterns and characteristics therefor;

FIGS. 4A, 4B and 4C show pattern arrangements of the common and non-common standard patterns shown in FIGS. 2A, 2B and 2C, respectively, which are represented by means of the mask patterns shown in FIG. 3;

FIGS. 6A to 6H show word construction stored in the memory means of FIG. 5;

FIG. 7 is a block diagram of an embodiment of this invention;

DESCRIPTION OF THE PREFERRED EMBODIMENTS

In this specification, the term "standard pattern" means a combination of positions of points and digital code of the points preselected so as to differentiate a standard type of a character to be recognized from different standard types belonging to categories different from the standard type.

Figure 1A:
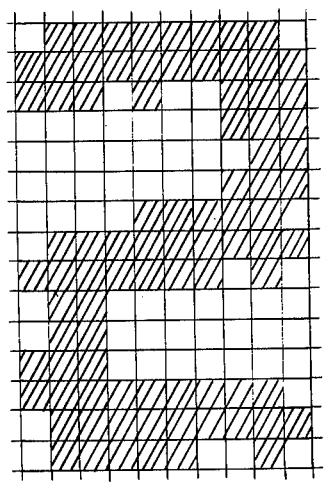
FIG. 1A shows an input pattern.
Figure 1B:
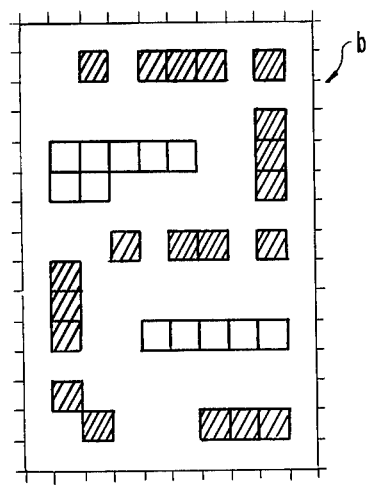
FIGS. 1B and 1C show pattern arrangements of standard patterns.
Figure 1C:
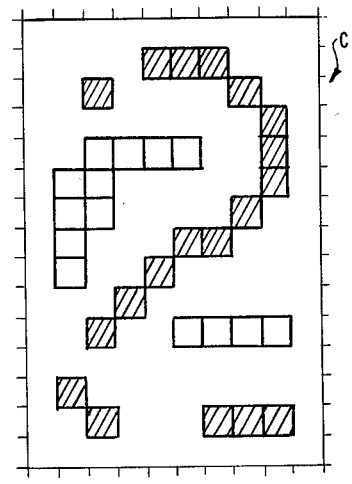

In an optical numeric-character recognizing system in which the numeric-characters of OCR-A and OCR-B defined by JIS (Japan Industry Standard) are read out and recognized, the number of the fonts is two (OCR-A and OCR-B), with the categories numbering 10 (0 – 9), and with the standard patterns being 20 in number. For example, in FIG. 1, standard patterns $b$ and $c$ of mutually different fonts respectively shown in FIGS. 1B and 1C belong to a category representing a numeral 2 as in the case of an input pattern $a$ shown in FIG. 1A. Hatched and unhatched squares in these drawings represent those elementary sections which are to be black and white, respectively. Needless to say, those mutually different fonts belonging to a common category may be treated as identical fonts, if they have strongly similar standard patterns.

The standard patterns $P_1, P_2, P_3 \text{ - - - } P_j \text{ - - - } P_n$ are classified into a plurality of groups $G_1, G_2, G_3 \text{ - - - } G_i \text{ - - - } G_m$, so that the patterns in each group have similar pattern arrangements. The relationship between the standard patterns and the groups may be represented as follows:

$G_1: P_{11}, P_{12}, \text{ - - - } P_{ij} \text{ - - - } P_{in(1)}$
$G_2: P_{21}, P_{22}, \text{ - - - } P_{2j} \text{ - - - } P_{2n(2)}$

.
.
.

$G_i: P_{i1}, P_{i2} \text{ - - - } P_{ij} \text{ - - - } P_{in(i)}$

.
.
.

$G_m: P_{m1}, P_{m2} \text{ - - - } P_{mj} \text{ - - - } P_{mn(m)}$ where, $n(1) + n(2) + \text{ - - - } n(i) \text{ - - - } + n(m) = n$ In group $G_i$, for example, there is provided a common standard pattern $PK_i$ having a common pattern arrangement which all of the standard patterns $P_{i1}, P_{i2}, \text{ - - - } P_{ij} \text{ - - - } P_{in(i)}$ have in common. Further, a plurality of non-common standard patterns $PH_{i1}, PH_{i2}, \text{ - - - } PH_{ij} \text{ - - - } PH_{im(i)}$ are provided, representing the differences between the standard patterns $P_{i1}, P_{i2}, P_{ij} \text{ - - - } P_{in(i)}$ and the common standard pattern $PK_i$, the non-common standard pattern $PH_{ij}$ with respect to the standard pattern $P_{ij}$ being represented as follows:

$$PH_{ij} = P_{ij} - PK_i.$$

Figure 2A:
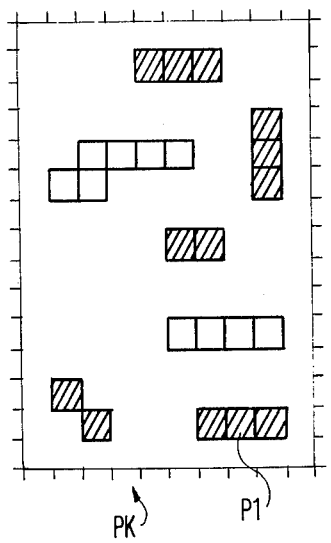
FIG. 2A shows a common standard pattern with respect to the standard patterns shown in FIGS. 1B and 1C.
Figure 2B:
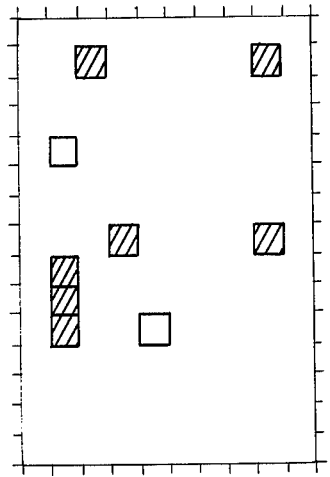
FIGS. 2B and 2C show non-common standard patterns with respect to the standard patterns shown in FIGS. 1B and 1C, respectively.
Figure 2C:
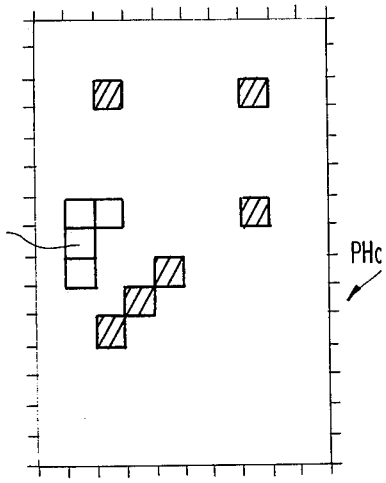

Referring to FIGS. 1 and 2, the standard patterns $b$ and $c$ belong to the same group. Shown in FIGS. 2A, 2B and 2C are the common standard patterns $PH_b$ and $PH_c$, respectively. As clearly understood from FIGS. 1 and 2, a memory capacity for 65 elementary sections is needed to memorize the patterns $b$ and $c$. In contrast, a corresponding memory capacity for only 42 sections is sufficient to memorize the patterns PK, $PH_b$ and $PH_c$.

The arrangement of black and white elementary sections in patterns PK, $PH_b$, and $PH_c$ are given by mask patterns $t_{a3}$, $t_{a2}$, $t_{a1}$ and $t_{a0}$ shown in FIG. 3, with the mask being applied in the order of $t_{a3}$ to $t_{a0}$ in such a manner that a section once covered by the mask is not covered by other masks. For example, the section arrangement P1 in the common standard pattern PK is designated by the mask pattern $t_{11}$, because all the center, right and left sections with respect thereto give logical 1 representing that it is black. As for P2 in the non-common standard pattern $PH_c$, all the center, upper and lower sections with respect thereto give logical 0 representing it is white. Therefore, the section arrangement P2 is given by the mask pattern $t_{02}$. Thus, the patterns PK, $PH_b$ and $PH_c$ are converted to the patterns PK', $PH_b'$ and $PH_c'$ shown in FIGS. 4A, 4B and 4C, respectively. As will be apparent from FIG. 4, the pattern formation carried out in this manner makes it possible to further reduce the memory capacity, because the patterns PK', $PH_b'$ and $PH_c'$ are represented by only 28 sections and the characteristics of the section arrangements.

Figure 5:
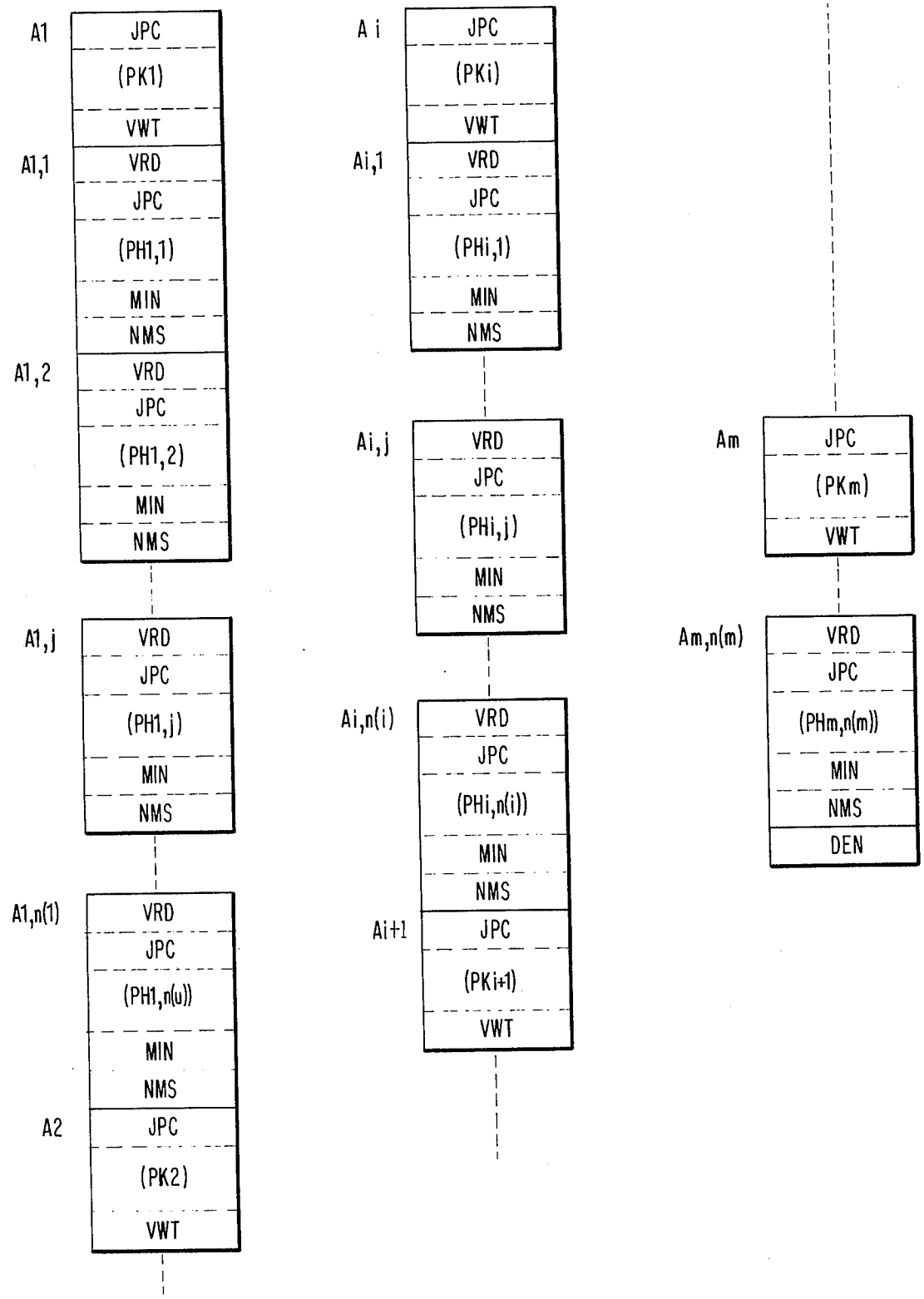
FIG. 5 shows a memory construction of memory means for storing the common and non-common standard patterns.

FIG. 5 shows memory construction of the memory STPM (FIGS. 7 and 8) for the standard patterns $P_1$, $P_2$ - - - $P_i$ - - - $P_n$. The data is memorized in the order of groups $G_1$, $G_2$, - - - and $G_m$, and in the order of patterns $PK_{i1}$, $PH_{i2}$ - - - $PH_{ij}$ - - - $PH_{im(i)}$ in group $G_i$. The combinations of the words representing the sections and the section arrangement characteristics of the common and the noncommon standard patterns $PK_i$ and $PH_{ij}$ are represented by ($PH_i$) and ($PH_{ij}$), respectively. The construction of the word is shown in FIG. 6A as PMK. In an address $A_i$ lying immediately ahead of the address having the data ($PK_i$) stored, the number of the words in the address $A_i - A_{i+1}$ is stored as JPC as shown in FIG. 6E. Further, in an address immediately following the data ($PK_i$), the VWT instruction shown in FIG. 6B is stored. There is stored in the address $A_{ij}$ the VRD instruction as shown in FIG. 6C. In the following address $A_{ij}+1$, there stored is the JPC instruction representing the number of words stored in the address ($A_{ij}+1$)−$A_{ij+1}$ where $j \neq n(i)$ and ($A_{ij}+1$)−$A_{i+1}$ where $j = n$ $(i)$. In the addresses following the address of the date ($PH_{ij}$), there are stored the MIN instruction shown in FIG. 6D, and the category-name-representing NMS instruction shown in FIG. 6F. In the last address of the memory STPM, the DEN instruction representing the end of all the standard patterns is stored with word construction shown in FIG. 6G.

Referring to FIG. 7, an embodiment of this invention comprises a flying spot scanner FSS, a pre-processing unit PPU, a character recognition unit CRU, a standard pattern memory STPM, and a control unit CONT. The scanner FSS scans characters on a document (not shown) to produce an electrical signal. The signal is then applied to the pre-processing unit PPU for processing such as noise elimination, character segmentation and equalization. The character recognition unit CRU recognizes the characters read by the scanner FSS by comparing the equalized input pattern from the pre-processing unit PPU with the standard patterns STP stored in the memory STPM. The scanner FSS, the unit PPU and CRU and the memory STPM are controlled by a control signal from the control unit CONT.

Figure 8:
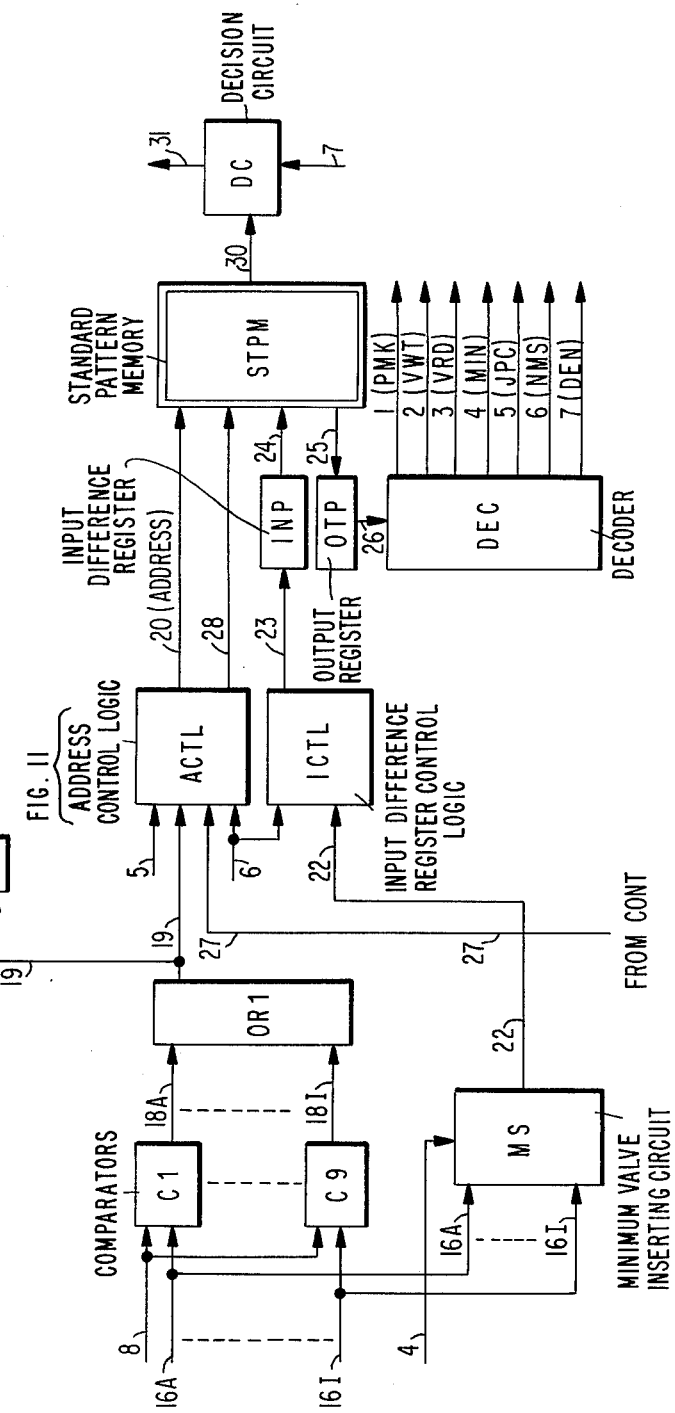
FIG. 8 is a block diagram of a character recognition unit and a memory of the embodiment shown in FIG. 7.

Referring to FIG. 8 showing the character recognition unit CRU and the standard pattern memory STPM in detail, the equalized input pattern is supplied from the pre-processing unit PPU via a line 11 to an input pattern register NPR and stored therein. The timing of the write-in of the input pattern is controlled by a timing signal from a line 10. When the input pattern has been stored in the register NPR, a driving signal is applied from the control unit CONT via a line 27 to an address control logic ACTL. The address control logic ACTL transmits not only an initial value to an address register in the memory STPM via a line 20 but also a memory driving signal to the memory STPM via a line 28. The data stored in the memory STPM are read out by one word and the read out data are written in an output register OTP.

Figure 12:
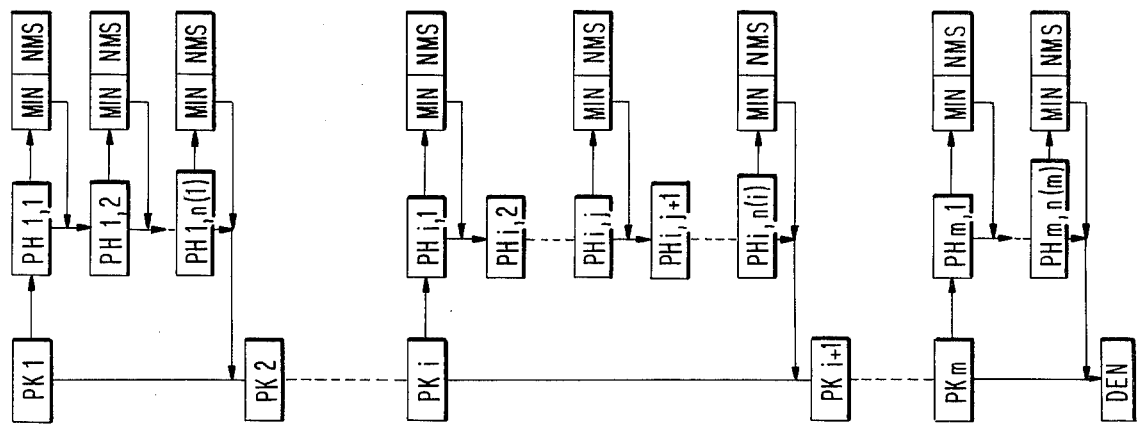
FIG. 12 is a flow chart of the character recognition.

The data from the output register OTP is transmitted via a line 26 to a decoder DEC, which transmits it to one of seven ouput lines 1 – 7 in accordance with a control bit of one to five digits as counted from the most significant digit. The output lines 1 – 7 correspond to the seven operation instructions shown in FIGS. 6A – 6G. With reference to FIGS. 5 and 8, it will be appreciated that the operation of the CRU begins with the JPC instruction of the first address AI being read into the address control logic ACTL on line 5. The operation of the CRU then proceeds according to the STPM memory construction shown in FIG. 5. FIG. 12 is a flow diagram of the operation of the CRU which is described in more detail below.

After the JPC instruction of address Ai is read into the address control logic ACTL, the PMK instruction (line 1) is supplied to the input pattern register NPR, whereby the data on a designated address to the coordinate bit of the PMK instruction is read out from the register NPR, and then written in a small-area register REG via a line 13. The PMK instruction is also supplied to bit comparators BIT1 – BIT9 and counters CT1 – CT9.

The input patterns have diversions in all directions due to analogue factors. Such diversions lower the efficiency of the recognition. To overcome this problem and to guarantee an accurate character recognition, the comparators BIT2 – BIT9 and the counters CT2 – CT9 are provided for processing the right, left, upward, downward, upper right, downward right, upper left and downward left diversion of input patterns. These comparaters and counters have the construction identical to the comparator BIT1 and the counter CT1, respectively. The comparators BIT1 – BIT9 compare the input data from the register REG with the data on the designated address of the memory STPM in the mask bit and the threshold parameter of the PMK instruction and in mesh. The signals representing the differences between those data are applied via lines 15A–15I to the counters CT1–CT9. The counters CT1–CT9 are reset by a signal supplied via a line 29 from an OR-circuit OR2 to which the VWT and NMS instructions and an output signal from an OR-circuit OR1 (line 19) are applied. The VWT instruction appearing on the output line 2 of the decoder DEC is applied to temporary memories TM1-TM9 to write the data in the counters CT1-CT9 therein, respectively (lines 16A-16I). The data stored in the memories TM1-TM9 are re-written in the counters CT1- CT9 in response to the VRD instruction (line 3).

The data in the counters CT1-CT9 are supplied via the lines 16A - 16I to comparators C1 - C9, respectively, to compare with a presettable value (line 8) and produce output signals only when the former is greater than the latter. Therefore, when at least one of the data in the counters CT1 - CT9 is greater than the presettable value, the output signal is obtained on the output line 19 of the OR-circuit OR1. The output signal stops the normal operation of the address control logic ACTL and changes the address by a value responsive to the parameter in the JPC instruction previously read out for the address Ai. The changed address is transmitted by the address control logic ACTL (line 20). This results in the VRD instruction for address A$i$, 1 being generated on line 3 so that the difference data stored in the memories TM1 - TM9 are re-written in the counters CT1- CT9. The JPC instruction for an address A$i$, 1 is then read into address control logic ACTL, and thereafter the first non-common standard pattern PH$i$,1 of the $i$th group G$_i$ is applied to the comparators BIT1 - BIT9 on line 1. The difference data singals produced by this comparison in comparators BIT1 - BIT9 is accumulated in the counters CT1 - CT9 so that these counters will contain the sum of the two difference data signals produced in comparing the common standard pattern PK$i$ and the non-common standard patterns PH$i$, $j$.

A minimum value selecting circuit MS detects the minimum value of the data in the counters under the control by the MIN instruction (line 4). The minimum value is transmitted to an input difference register control logic ICTL via a line 22 as a signal representative of the difference between the input pattern and the standard pattern. The control logic ICTL produces a combination of the difference and the parameter in the NMS instruction (i.e., a category name) as shown in FIG. 6H and transmits it to an input difference register INP (line 23). The NMS instruction from the line 6 is also supplied via the control logic ACTL to the memory STPM.

When the DEN instruction is read out, a final decision circuit DC read out the difference data and the category name stored in the memory STPM (line 30), and detects the minimum difference value and the category name therefor (line 31). FIG. 12 illustrates the complete process as just described.

Figure 9:
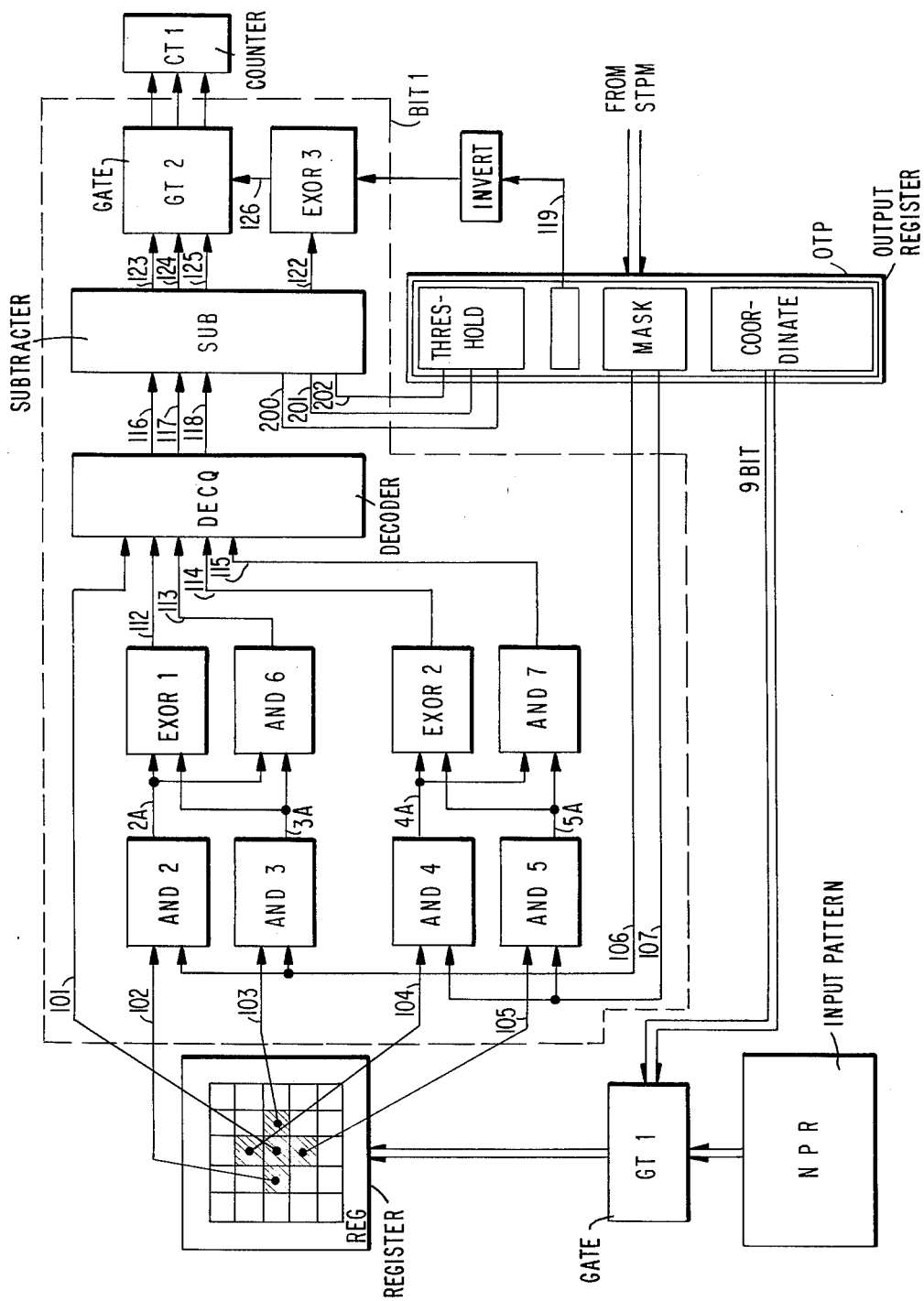
FIG. 9 is a block diagram of a bit comparator of the character recognition unit shown in FIG. 8.

Referring to FIG. 9 showing the bit comparator BIT1 (inside of the dotted line) in detail, the designated part of the input pattern stored in the input pattern register NPR is transmitted via a gate GT 1 to the register REG. The gate GT 1 is controlled by the coordinate parameter of 9 bits stored in the output register OTP. The register REG comprises 25 registers forming a 5×5 matrix. Lines 101-105 are connected to the corresponding registers in the register REG. The line 101 is also connected to decoder DECQ. The data from the lines 102 and 103 are transmitted via AND-circuits AND 2 and AND 3 to the decoder DECQ, only when the lower significant digit 106 of the mask bit stored in the output register OPT is logical 1. The data from the lines 104 and 105 are transmitted via AND-circuits AND 4 and AND 5 to the decoder DECQ, only when the higher digit 107 is logical 1.

The output signals 2A and 3A of the AND-circuits AND 2 and AND 3 are supplied to an exclusive OR circuit EXOR 1 and an AND-circuit AND 6. Similarly, the signals 4A and 5A are supplied to an exclusive OR circuit EXOR and an AND-circuit AND 7. The signals from the circuits EXOR 1, AND 6, EXOR 2 and AND 7 are supplied via lines 112-115 to the decoder DECQ which produces a digital signal representing the number of the black sections in the register REG masked by the mask bit.

A subtracter SUB calculates the difference between the digital signal from the decoder DECQ (lines 116, 117 and 118) and the threshold bit stored in the register OPT (lines 200, 201 and 202). The signal on the line 119 signifies that the value of the digital signal from the decoder DECQ is greater than that of the threshold bit. The signal on the line 122 is a carry bit of the subtracter SUB. The output signal from the substracter SUB (lines 123-125) is gated by the output signal (on the line 126) of the exclusive OR circuit EXOR 3 to which the signals on the lines 119 and 122 are connected as inputs.

The subtracter SUB substracts the threshold bit (lines 200-202) from the value of digital signal on the lines 116-118 of the decoder DECQ to provide the difference value (lines 123-125), which is transmitted via the gate circuit GT 2 to the counter CT 1 only when the output signal appears on the line 126. Thus, counter CT 1 counts the value of the difference between the input pattern and the standard pattern.

Figure 10:
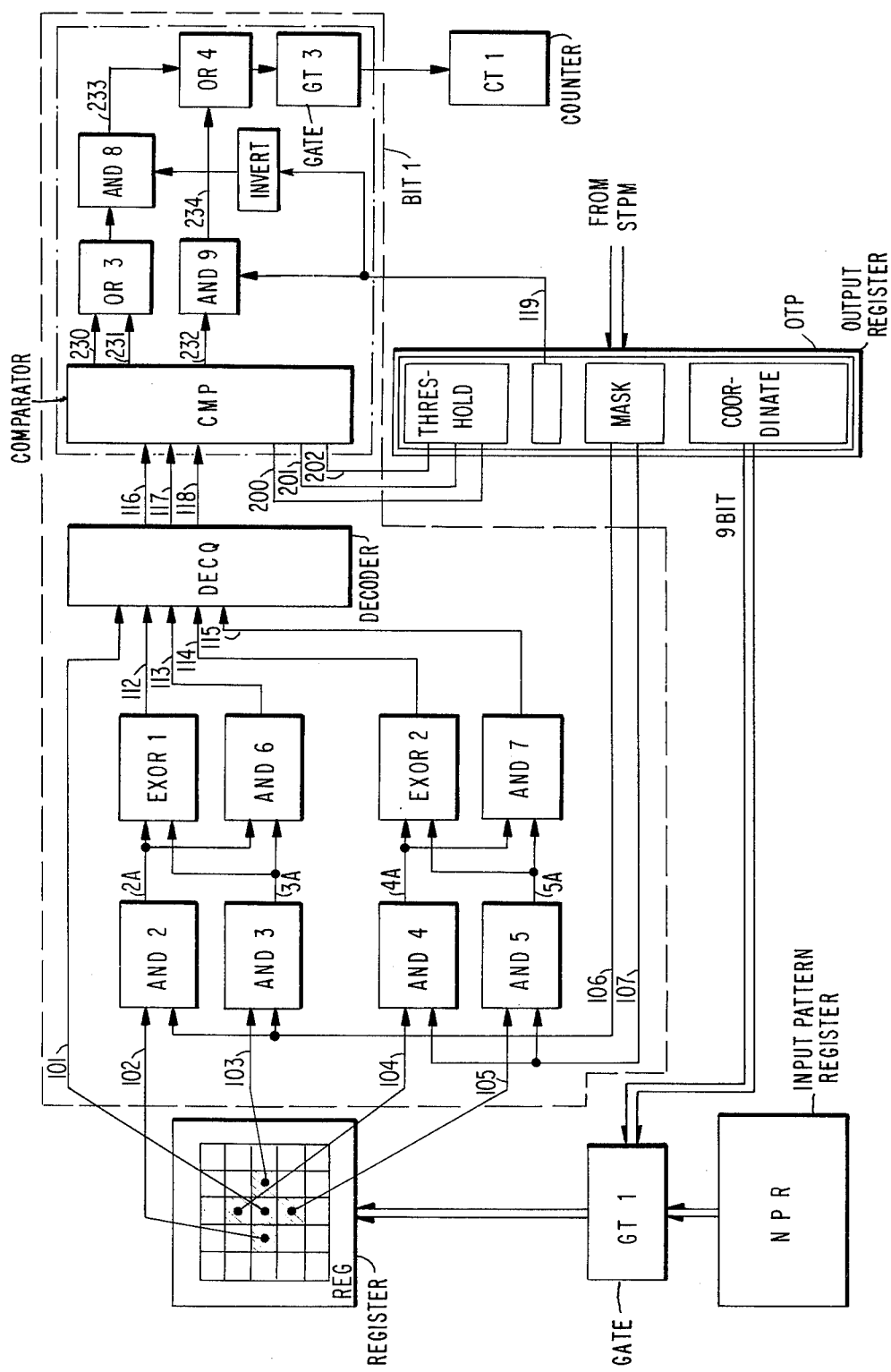
FIG. 10 is a block diagram of another example of the bit comparator.

It is possible to give weights to the significant elementary sections in the standardized pattern by making the counting of the difference constant, i.e., by supplying the same value to the counter CT 1 without regard to the mask patterns. An example of such modification is shown in FIG. 10, in which the construction is identical to FIG. 9 except for that surrounded by the dot and dash line. A comparator CMP compares the digital signal from the decoder DECQ with the threshold bit and produces output signals on lines 230, 231 and 232 when the latter is greater than, equal to and less than the former, respectively. The output signals on lines 230 and 231 are applied via an OR-circuit OR 3 to an AND-circuit AND 8 to which the signal on the line 119 is also applied. The output signal on the line 232 is applied to an AND-circuit AND 9 to which the signal on the line 119 is applied via an inverter. The output signals on lines 233 and 234 are applied via an OR-circuit OR 4 and a gate circuit GT 3 to the counter CT 1.

Figure 11:
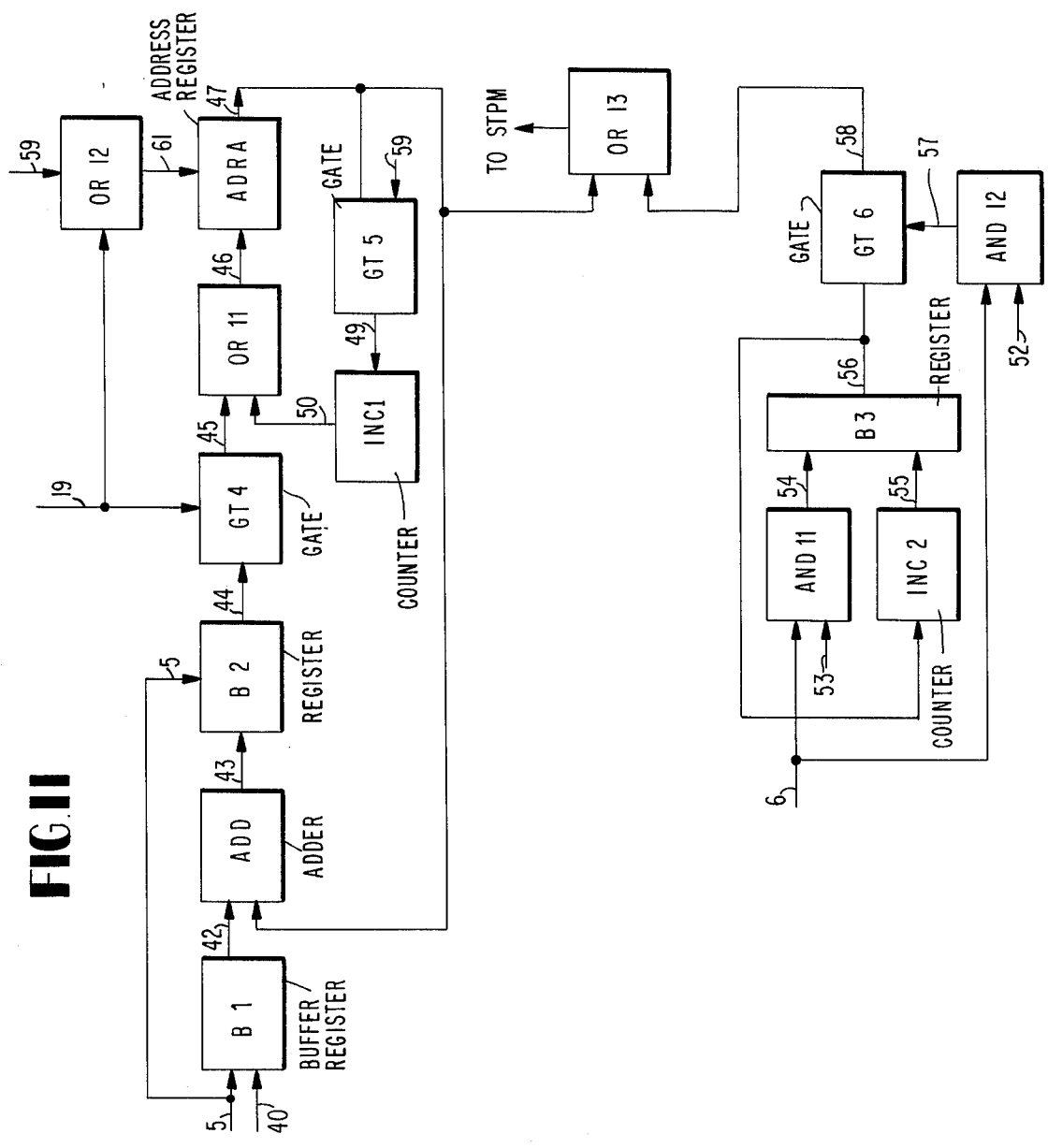
FIG. 11 is a block diagram of an address control logic of the character recognition unit shown in FIG. 8.

Referring to FIG. 11 showing the address control logic ACTL in detail, the parameter in JPC instruction is applied via a line 40 to a buffer register B1 and set therein in response to the signal on the output line 5 of the output register OPT. The output signal of the register B1 is applied via a line 42 to an adder ADD and is added to a signal on a line 47 applied from an address register ADRA. Thus, the adder ADD provides on the line 43 the added value of the address for the JPC instruction and the parameter in the JPC instruction. The added value is set in response to the JPC instruction on the line 5.

When the signal is present on the line 19, the added value is applied via the line 44, a gate circuit GT 4, a line 45, an OR-circuit OR 11, and a line 46 to the address register ADRA. The signal on the line 19 is also applied via an OR-circuit OR 12 and a line 61 to the register ADRA. The output signal of the register ADRA is applied via the line 47 and an OR-circuit OR 13 to the memory STPM. Thus, when the signal is present on the line 19, the content of the register ADRA is changed.

To fetch the register STPM, a signal having a constant repetition period is applied via a line 59 to the OR-circuit OR 12 and a gate circuit GT 5, but is inhibited when the signal is on the line 19. The output signal on the line 47 is applied via the gate GT 5, a line 49, a counter INC 1 and the line 50 to the OR-circuit OR 11 when the signal is on the line 59. The counter INC 1 adds the signal on the line 49 by +1. Thus, when the signal is on the line 59, the content of the register ADRA is added by +1 in every cycle.

There is provided a buffer register B3 which is used in case where the data is memorized in the memory STPM. The NMS instruction on the line 6 and a signal on a line 52 given in response to the writing instruction to the memory STPM are applied to an AND-circuit AND 12. The output signal of the register B3 is applied via a line 56 and a gate circuit GT 6 to the line 58 when the signal is on the line 57. A counter INC 2 adds by +1 to the content of the signal on the line 56. The output signal on the line 55 is set in the buffer register B3 when a signal is on a line 54, i.e., when the NMS instruction on the line 6 and a timing pulse on a line 53 are applied to an AND-circuit AND 11. The timing pulse on the line 53 is produced with a time delay to the pulse on the line 52 by a period of time for the adding in the counter INC 2.

In summary, FIG. 12 shows a flow chart illustrating the operation of this embodiment, in which the bottom-pointing arrow indicates the following address for the case where the content of one of the counters CT 1–CT 9 reaches a predetermined value, and the right-pointing arrow indicates the flow for the case where the content of the counters CT 1–CT 9 does not reach the predetermined value.

What is claimed is:

1. A character recognizing system for recognizing an input pattern of a character by comparing with a plurality of standard patterns characterized in that said standard patterns are classified into a plurality of groups, each group having a common standard pattern and a plurality of non-common standard patterns, said common standard pattern of each group having a pattern arrangement in common with said standard patterns of the same group, and said non-common standard patterns of the same group representing differences between said standard patterns of the same group and said common standard pattern of the same group, and by comprising:

means for storing said common standard patterns and said non-common standard patterns;
    a first comparison means for comparing said input pattern with a common standard pattern of a group to provide a first data signal representative of the difference therebetween;
    a second comparison means for comparing said first data signal with a predetermined value to provide a second data signal when said first data signal is less than said predetermined value;
    a third comparison means responsive to said second data signal for comparing said input pattern with the non-common standard patterns in said group to provide the sum of said first data signal and a third data signal representative of the difference between said input pattern and said non-common standard patterns; and
    means responsive to said third comparision means for generating a signal proportional to a minimum sum of differences represented by said first and third data signals.

2. A character recognizing system as recited in claim 1 wherein said second comparison means produce a control signal only when said first data signal is greater than said predetermined value, and further comprising:
    address control means responsive to said control signal from said second comparison means for reading out of said means for storing the common standard pattern of another group for comparing with said input pattern.

3. A character recognizing system as recited in claim 2 further comprising:
    means for writing into said means for storing, signals representative of the differences between the input pattern and the standard patterns together with group identifying data for each difference signal; and
    wherein said means responsive to said third comparison means comprises decision means responsive to the last comparison of said input pattern with said standard patterns of said plurality of groups for reading out the difference and group identifying data from said means for storing and selecting the minimum difference value.

4. A character recognizing system as recited in claim 3 wherein said first comparison means for comparing said input pattern with said common standard pattern comprises nine comparators for processing the right, left, upward, downward, upper right, downward right, upper left and downward left divisions of said input pattern.

* * * * *

UNITED STATES PATENT AND TRADEMARK OFFICE
CERTIFICATE OF CORRECTION

PATENT NO. : 4,027,284
DATED : May 31, 1977
INVENTOR(S) : Yukio HOSHINO et al

It is certified that error appears in the above-identified patent and that said Letters Patent are hereby corrected as shown below:

IN THE SPECIFICATION:

Column 3, line 9, delete "65" insert --63-- line 39, delete "$PK_{i1}$, $PH_{i2}$ ---$PH_{ij}$ ---$PH_{im(i)}$ in group $G_i$" and insert -- $PK_i$, $PH_{i1}$, $PH_{i2}$ ---$PH_{ij}$ ---$PH_{in(i)}$ in group $G_i$-- line 43, delete "$(PH_i)$" insert --$(PK_i)$-- line 56, delete "date" insert --data--

Column 4, line 7, delete "unit" insert --units-- line 57, delete "comparaters" insert --comparators--

UNITED STATES PATENT AND TRADEMARK OFFICE
CERTIFICATE OF CORRECTION

PATENT NO. : 4,027,284
DATED : May 31, 1977
INVENTOR(S) : Yukio HOSHINO et al

It is certified that error appears in the above-identified patent and that said Letters Patent are hereby corrected as shown below:

Column 5, line 28, delete "singals" insert --signals--

Column 6, line 7, after "EXOR" insert --2-- line 43, delete "latter" insert --former-- line 44, delete "former" insert --latter--

Column 7, line 22, delete "AND 12" insert --AND 11--

IN THE CLAIMS:

Column 8, line 25, delete "produce" insert --produces--

Signed and Sealed this

Sixth Day of December 1977

[SEAL]

Attest:

RUTH C. MASON
*Attesting Officer*

LUTRELLE F. PARKER
*Acting Commissioner of Patents and Trademarks*